(12) United States Patent
Kitazawa

(10) Patent No.: US 7,411,598 B2
(45) Date of Patent: Aug. 12, 2008

(54) LINE HEAD AND IMAGE FORMING APPARATUS

(75) Inventor: Takayuki Kitazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 391 days.

(21) Appl. No.: 11/186,832

(22) Filed: Jul. 22, 2005

(65) Prior Publication Data

US 2006/0066708 A1 Mar. 30, 2006

(30) Foreign Application Priority Data

Sep. 30, 2004 (JP) ............................. 2004-289225

(51) Int. Cl.
*B41J 2/45* (2006.01)
(52) U.S. Cl. ...................... 347/130; 347/238
(58) Field of Classification Search ................. 347/130, 347/238
See application file for complete search history.

(56) References Cited

U.S. PATENT DOCUMENTS 4,524,372 A * 6/1985 De Cock et al. ............ 347/238
4,941,004 A * 7/1990 Pham et al. ................. 347/132
5,150,016 A * 9/1992 Sawase et al. .............. 315/294
5,818,488 A * 10/1998 Tanuma et al. ............. 347/130
6,943,447 B2 9/2005 Ishizuki et al.
2004/0114026 A1* 6/2004 Kondo et al. ............... 347/238
2005/0231580 A1* 10/2005 Yamazaki et al. .......... 347/130

FOREIGN PATENT DOCUMENTS

| JP | A-02-256271 | 10/1990 |
| JP | A-06-234238 | 8/1994 |
| JP | U-07-018465 | 3/1995 |
| JP | A-09-118033 | 5/1997 |
| JP | A 11-274569 | 10/1999 |
| JP | A-2002-023593 | 1/2002 |
| JP | A-2003-204129 | 7/2003 |

* cited by examiner

*Primary Examiner*—Huan H Tran
(74) *Attorney, Agent, or Firm*—Oliff & Berridge, PLC

(57) ABSTRACT

A line head includes pixel circuits each of which has a plurality of light-emitting elements and circuit elements arranged in a line, and that make the light-emitting elements emit light selectively, based on selecting signals and data signals; selecting circuits that generate the selecting signals based on clock signals input through clock signal lines; data lines that supply data signals to the pixel circuits; and a conductive line having low impedance, arranged in the vicinity of the clock signal line.

14 Claims, 4 Drawing Sheets

LINE HEAD AND IMAGE FORMING APPARATUS

BACKGROUND

The present invention relates to a line head and to an image forming apparatus.

A line head is known as a device for forming (exposing) an electrostatic latent image on a surface of a photoconductor incorporated into an image forming apparatus of an electro-photographic system, such as a copy machine, a printer, or the like. The line head is provided with a plurality of light-emitting elements one-dimensionally arrayed on a substrate, and the respective light-emitting elements are driven through wiring lines patterned on the substrate. Light-emitting diodes (LEDs) and organic EL elements are utilized as the light-emitting elements of the line head. A light-emitting element array corresponding to this line head and an image forming apparatus are disclosed in, for example, Japanese Unexamined Patent Application Publication No. 11-274569.

In general, data lines and control signal lines are arranged according to the arrangement of light-emitting elements, in an organic EL panel used for the line head. Therefore, the length of the wiring lines reaches several tens of centimeters, which is likely to cause a build-up of static electricity and electrostatic breakdown to occur in circuits other than an input buffer. In particular, among the control signal lines, clock signal lines for sequentially selecting a plurality of light-emitting elements are disposed to be separated from other wiring lines, in order to reduce parasitic capacitance, so that static electricity is likely to build-up. Accordingly, electrostatic breakdown is more likely to occur in a circuit connected to the clock signal line than other wiring lines.

SUMMARY

An advantage of the invention is that it provides a line head and an image forming apparatus capable of preventing electrostatic breakdown of a circuit connected to a clock signal line.

According to a first aspect of the invention, there is provided a line head including: pixel circuits each of which has a plurality of light-emitting elements and circuit elements arranged in a line, and make the light-emitting elements emit light selectively, based on selecting signals and data signals; selecting circuits which generate the selecting signals based on clock signals input through clock signal lines; data lines which supply data signals to the pixel circuits; and a conductive line having low impedance, arranged in the vicinity of the clock signal line. According to this aspect, static electricity builds up on the conductive line having low impedance. Thus, electrostatic breakdown of the clock signal line can be prevented.

It is preferable that the conductive line be provided to surround the clock signal line. According to this structure, the clock signal line is surrounded by the conductive line having low impedance. Thus, static electricity builds up on the conductive line having low impedance, thereby preventing electrostatic breakdown of a circuit connected to the clock signal line.

It is preferable that the conductive line be a power wiring line. According to this structure, static electricity builds up on the power wiring line having low impedance, thereby preventing electrostatic breakdown of a circuit connected to the clock signal line.

It is preferable that the power wiring line be a ground wiring line. According to this structure, static electricity builds up on the ground wiring line having low impedance, thereby preventing electrostatic breakdown of a circuit connected to the clock signal line.

It is preferable that the light-emitting element be an organic EL light-emitting element. According to this structure, the line head using the organic EL light-emitting element as a light-emitting element can achieve the above-mentioned effects and operations.

According to a second aspect of the invention, there is provided an image forming apparatus including: photoconductors; charging units which charge the photoconductors uniformly; exposing units which have the line heads, respectively, to form electrostatic latent images of a target image on the photoconductors by exposing the photoconductors; developing units which develop the electrostatic latent images on the photoconductors as toner images; transferring units which transfer the toner images on the photoconductors to a transfer member; and fixing units which fix the toner images on the transfer member. According to this structure, electrostatic breakdown of the clock signal line can be prevented, thereby preventing defects and securely performing operations.

It is preferable that the image forming apparatus form a color image. According to this aspect, electrostatic breakdown of the clock signal line in the line head for forming a color image can be prevented, thereby preventing defects and securely performing operations.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Hereinafter, a line head and an image forming apparatus according to an embodiment of the invention will be described with reference to the accompanying drawings.

Figure 1:
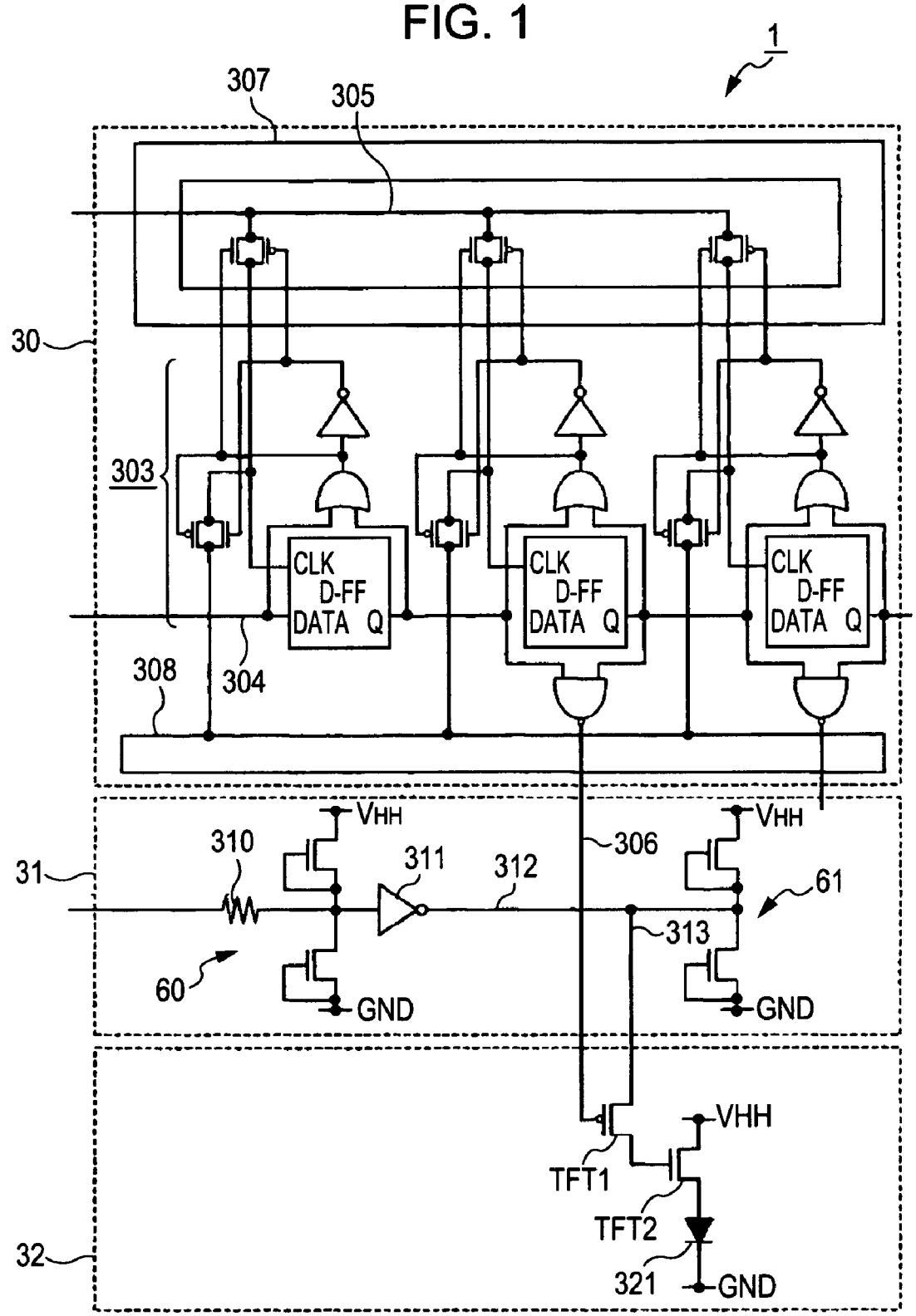
FIG. 1 is a schematic circuit diagram showing the structure of a line head according to an embodiment of the invention.

FIG. 1 is a schematic circuit diagram showing the structure of a line head according to an embodiment of the invention. Main components of the line head 1 are a selecting circuit 30, a data line portion 31, and a pixel circuit 32. The selecting circuit 30 is composed of shift registers 303 for sequentially driving the pixel circuits 32, and includes a power wiring line 307 and a ground wiring line 308 for a logic circuit. The shift register 303 sequentially transmits a start pulse supplied to an initial stage to the following stage through a start signal line 304 in synchronization with a clock signal of a clock signal line 305, and supplies output signals from the respective stages to the pixel circuit 32 through a gate line 306 as a selecting signal for sequentially selecting light-emitting elements 321 in the pixel circuit 32.

The power wiring line 307 for a logic circuit is arranged to surround the clock signal line 305, as shown in FIG. 1. This is for preventing electrostatic breakdown caused by static electricity from the exterior, due to the fact that the clock signal line 305 is surrounded by the power wiring line 307 for a logic circuit having low impedance. Therefore, if wiring lines having low impedance are used in designing circuits, for example, the ground wiring line 308 for a logic circuit, a power wiring line 301 for a pixel circuit, and a ground wiring line 302 for a pixel circuit may surround the clock wiring line 305 in addition to the power wiring line 307 for a logic circuit.

The data line portion 31 is a wiring line portion which transmits data signals for making the light-emitting element 321 emit or not emit light through a protective resistor 310 and an input buffer 311 disposed in a data line 312. The data signal is supplied to the data line 312 from the exterior in synchronization with the clock signal, and is then supplied to the pixel circuit 32 via a leading line 313. In the data line 312, an ESD protective element 60 is additionally provided between the protective resistor 310 and the input buffer 311, and an ESD protective element 61 is additionally provided at a front end of the data line.

The pixel circuit 32 is composed of the light-emitting element 321, a holding transistor TFT1 serving as a circuit element, and a driving transistor TFT2. The holding transistor TFT1 has its gate terminal connected to the gate line 306, its source terminal connected to the leading line 312, and its drain terminal connected to a gate terminal of the driving transistor TFT2. In addition, the driving transistor TFT2 has its source terminal connected to a power supply, that is, a power wiring line 301 for a pixel circuit, and its drain terminal connected to an anode terminal of the light-emitting element 321. Even though the light-emitting element 321 is, for example, an organic EL light-emitting element whose light-emitting body is formed of organic materials, it may be an LED. A cathode terminal of the light-emitting element 321 is connected to a GND, that is, a ground wiring line 302 for a pixel circuit.

The light-emitting element 321 in the pixel circuit 32 is selected by a selecting signal input from the shift register 303 through the gate line 306, and is controlled to emit/not to emit light according to data signals input through the data line 312 and the leading line 313. That is, the shift register 303 sequentially transmits a start pulse to the following stage in synchronization with a clock signal, thereby selecting the light-emitting element 321. Accordingly, the light-emitting element 321 selected by the shift register 303 is controlled to emit/not to emit light according to a voltage level of a data signal, that is, an L (low) level or H (high) level.

Even though only one light-emitting element 321 is shown in FIG. 1, n (for example, 5120) light-emitting elements 321 are arranged in a line on the substrate. Also, these n light-emitting elements 321 constitute blocks each composed of m (for example, 128) light-emitting elements, and a selecting signal output from each stage of the shift register 303 selects the block.

Figure 2:
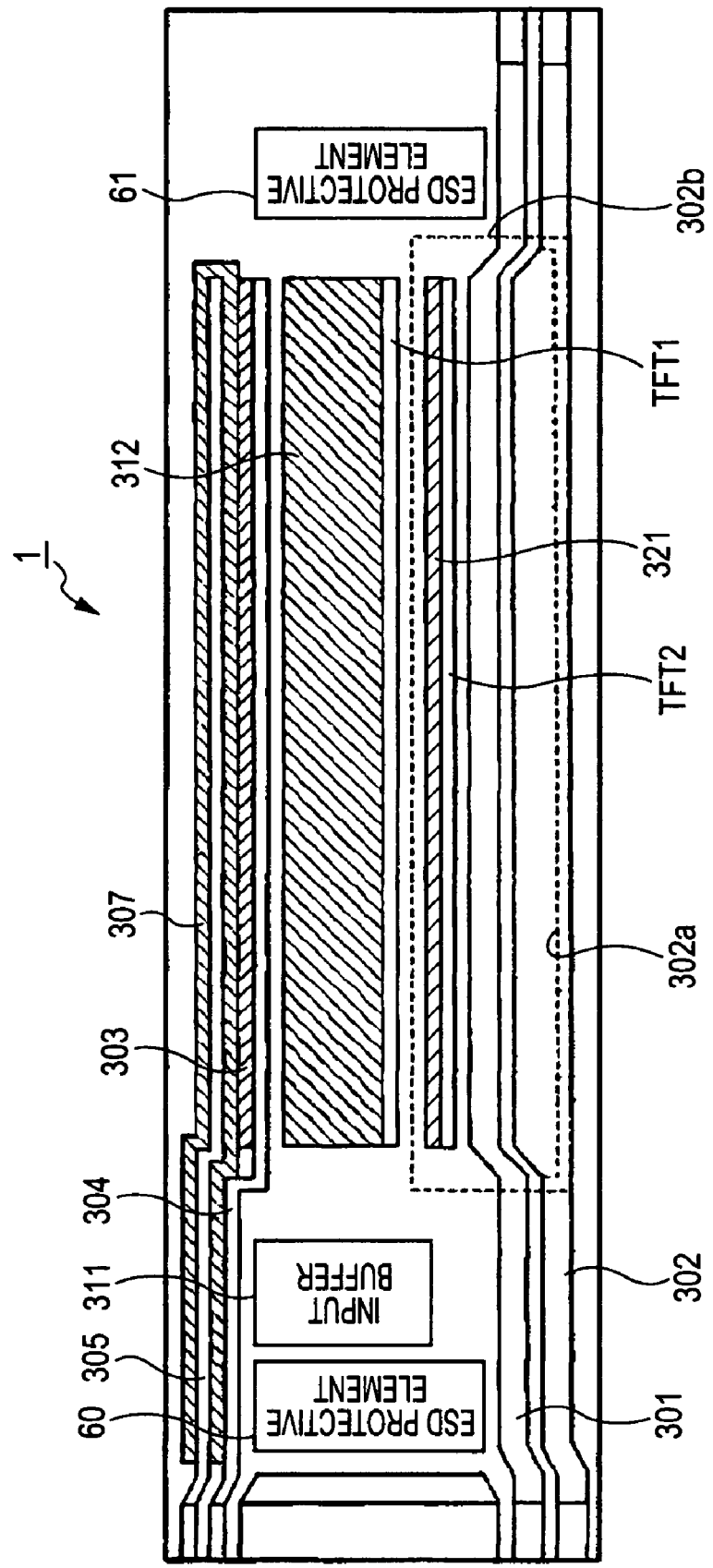
FIG. 2 is a schematic diagram showing the structure of a layout of the line head according to the embodiment of the invention.

Next, FIG. 2 is a schematic diagram showing a circuit layout of the line head 1. In FIG. 2, constituent elements corresponding to those of FIG. 1 are denoted by the same reference numerals.

The shift register 303 is arranged between the power wiring line 307 for a logic circuit and the ground wiring line 308 for a logic circuit. The clock signal line 305 is surrounded by the power wiring line 307 for a logic circuit, as shown in the drawing. The data line 312 is provided adjacent to the power wiring line 307 for a logic circuit, and the holding transistors TFT1 are arranged in a line. In addition, the light-emitting element 321 and the driving transistor TFT2 are linearly arranged adjacent to the data line 312 and the holding transistor TFT1.

The power wiring line 301 for a pixel circuit is arranged adjacent to the light-emitting element 321 and the driving transistor TFT2, and the ground wiring line 302 for a pixel circuit is arranged adjacent to the power wiring line 301 for a pixel circuit. Further, a rear cathode 302*b* and a ground contact 302*a* for leading the ground wiring line 302 for a pixel circuit inward are disposed in the light-emitting element 321 and the driving transistor TFT2. ESD protective elements 60 and 61 are arranged at predetermined locations.

The above-mentioned embodiment is characterized in that the clock signal line 305 is surrounded by the power wiring line 307 for a logic circuit. By this structure, static electricity generated from the corresponding unit builds up at the power wiring line 307 for a logic circuit having low impedance other than the clock signal line 305. Thus, static electricity can be suppressed from building up on the clock signal line 305, thereby preventing electrostatic breakdown of a circuit connected to the clock signal line 305.

Next, an image forming apparatus according to the present embodiment, that is, an image forming apparatus using the above-mentioned line head 1 as four line heads 11K, 11C, 11M, and 11Y will be described.

Figure 3:
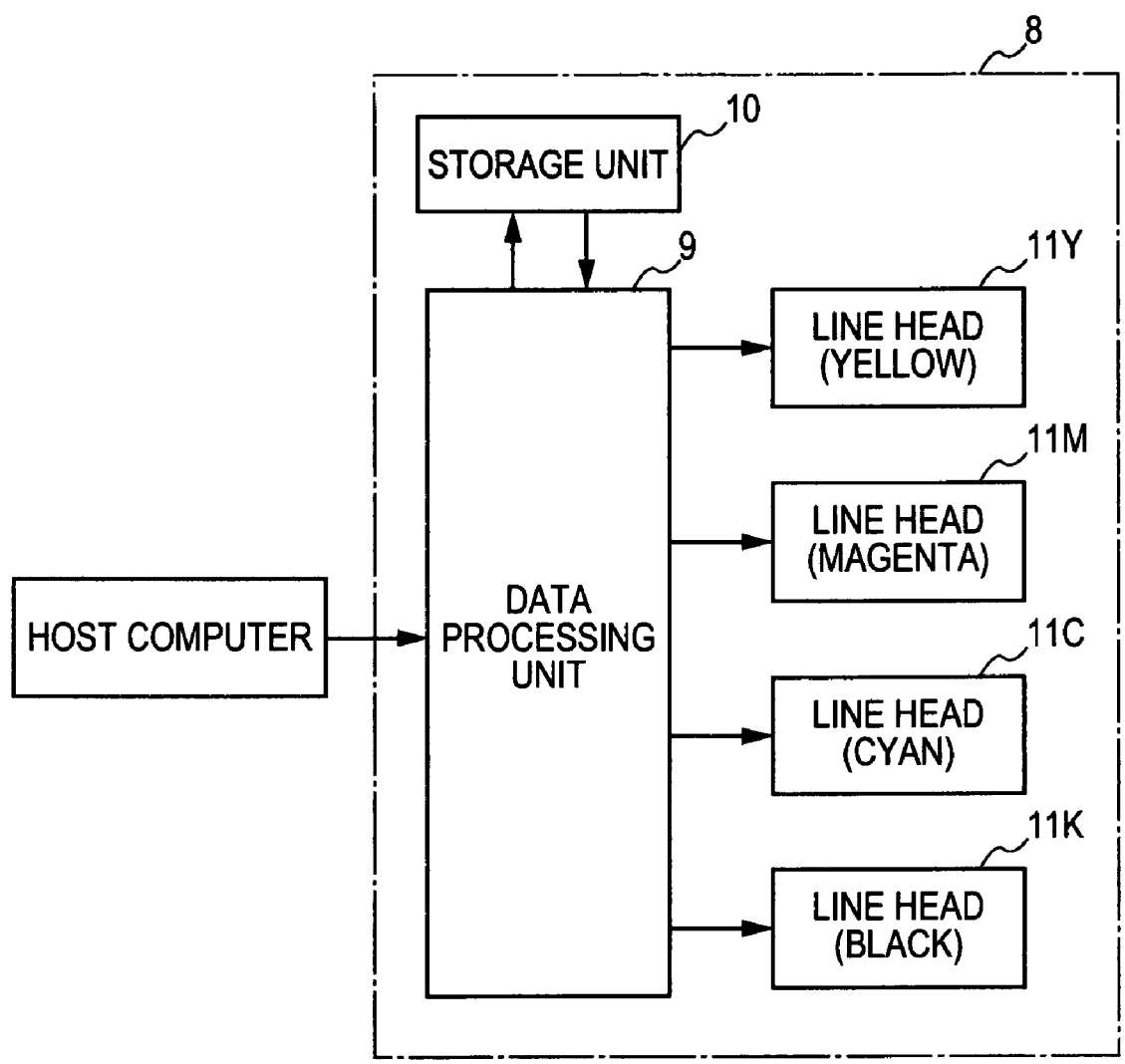
FIG. 3 is a block diagram showing the process of image data of an image forming apparatus according to the embodiment of the invention.

First, a function for processing image data of the image forming apparatus will be described with reference to FIG. 3. The control unit, which controls the overall operation of the imaging forming device, is provided with a data processing unit 9 including a CPU, an image processing circuit, and the like, and a storage unit 10 for storing original image data or the like. The image forming apparatus forms not only black-and-white images but also color images, and four line heads 11K, 11C, 11M, and 11Y corresponding to primary colors of 'black', 'cyan', 'magenta', and 'yellow', which are used when forming images, are provided.

Here, alphabets K, C, M, and Y, which are added to the ends of the reference numerals of the line heads 11K, 11C, 11M, and 11Y, indicate the primary colors of black, cyan, magenta, and yellow when the images are formed. These alphabets of K, C, M, and Y are added to other components, which will be described below, in the same manner.

The data processing unit 9 reads out original image data (bit map data) which is stored in the storage unit 10 after being transmitted to the image forming apparatus from an external host computer, and performs screen processing, color conversion processing, data conversion processing, and data transferring processing with respect to it. The screen processing is performed for the purpose of matching with process conditions of the image forming apparatus and securing gradation reproducibility. The screen processing is a process that combines a line pattern, an error diffusion pattern, and a halftone dot pattern. The color conversion processing serves to covert the image data subjected to the screen processing into data which is separated into colors corresponding to the line heads 11K, 11C, 11M, and 11Y. The data conversion processing serves to convert the image data subjected to the color conversion processing into data signals to be transmitted to the line heads 11K, 11C, 11M, and 11Y. The data transferring processing serves to transfer the data for transmission to each of the line heads 11K, 11C, 11M, and 11Y.

Figure 4:
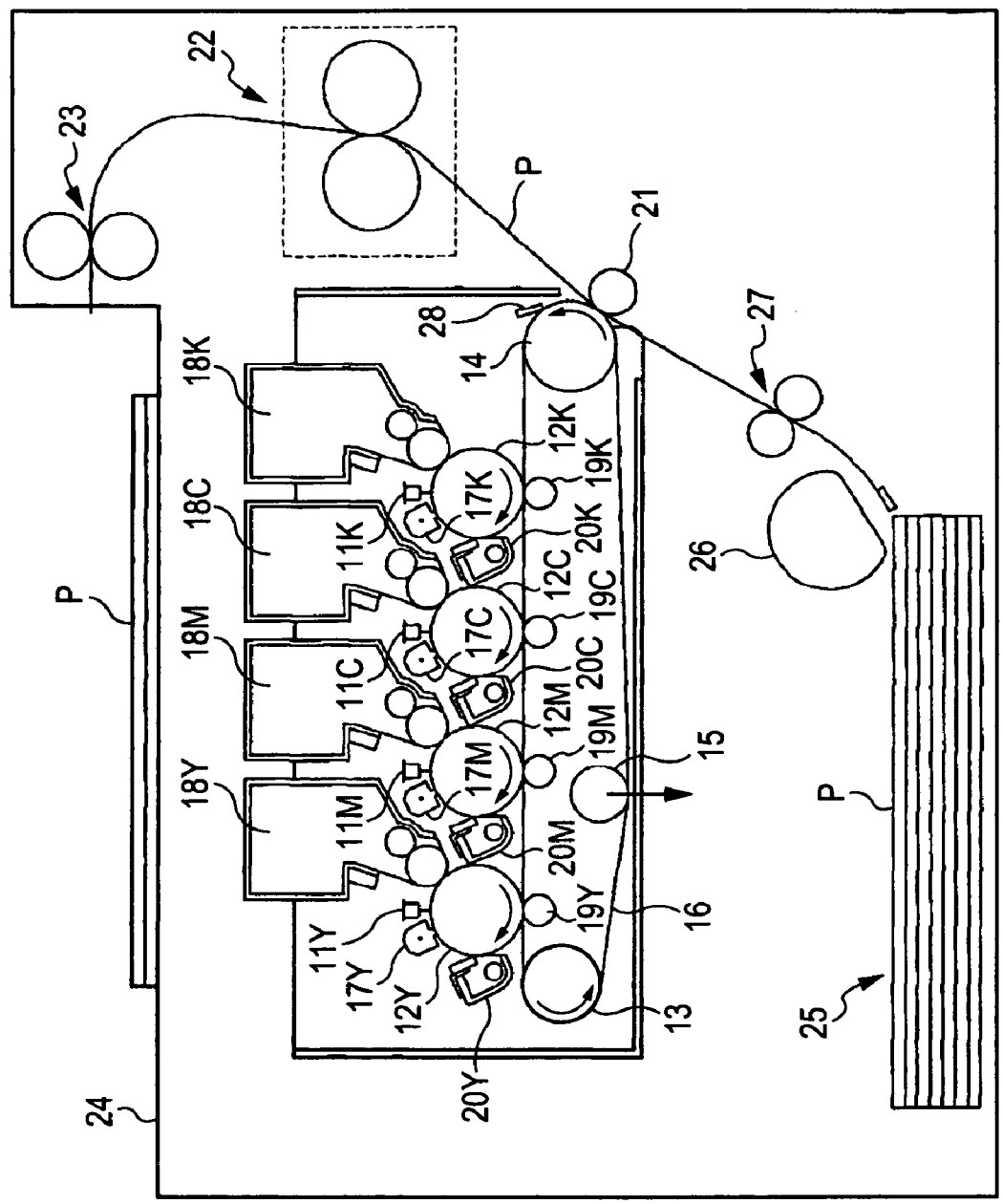
FIG. 4 is a cross-sectional view showing the structure of the image forming apparatus according to the embodiment of the invention.

FIG. 4 is a longitudinal cross-sectional view showing the structure of the image forming apparatus according to the present embodiment. The image forming apparatus is a tandem-type image forming apparatus constructed such that four line heads 11K, 11C, 11M, and 11Y having the same structure are respectively arranged at exposure locations of four corresponding photoconductor drums 12K, 12C, 12M, and 12Y having the same structure.

The image forming apparatus includes an driving roller 13, a driven roller 14, a tension roller 15, and an intermediate transfer belt 16 which extends by applying the tension by the tension roller 15, thereby cyclically being driven in an arrow direction in the drawing (counter-clockwise). The four photoconductors 12K, 12C, 12M, and 12Y, which serve as four image carriers and have each photosensitive layer formed on an outer peripheral surface, are arranged at a predetermined gap with respect to the intermediate transfer belt 16.

The photoconductor drums 12K, 12C, 12M, and 12Y are rotatably driven in an arrow direction in the drawing (clockwise) in synchronization with the driving of the intermediate transfer belt 16. Corona chargers 17K, 17C, 17M, and 17Y which uniformly charge outer peripheral surfaces of the respective photoconductor drums 12K, 12C, 12M, and 12Y, and the line heads 11K, 11C, 11M, and 11Y which sequentially perform line-scanning on the outer peripheral surfaces of the respective photoconductor drums 12K, 12C, 12M, and 12Y which are uniformly charged by the corona charger 17K, 17C, 17M, and 17Y in synchronization with the rotations of the photoconductor drums 12K, 12C, 12M, and 12Y are arranged around the photoconductor drums 12K, 12C, 12M, and 12Y.

Furthermore, developing units 18K, 18C, 18M, and 18Y which apply a toner, serving as a developing agent, to electrostatic latent images formed by the line heads 11K, 11C, 11M, and 11Y, thereby making the electrostatic latent images into toner images; first transfer rollers 19K, 19C, 19M, and 19Y, serving as transferring units, which sequentially transfers the toner images developed by the developing units 18K, 18C, 18M, and 18Y to the intermediate transfer belt 16 that is a first transfer target; and cleaning units 20K, 20C, 20M, and 20Y which remove the toner remaining on the surfaces of the respective photoconductor drums 12K, 12C, 12M, and 12Y after transfer are provided around the respective photoconductor drums 12K, 12C, 12M, and 12Y.

Here, the respective line heads 11K, 11C, 11M, and 11Y are fixed such that the above-mentioned organic EL light-emitting element is arranged parallel to buses of the respective photoconductor drums 12K, 12C, 12M, and 12Y. Peak wavelengths of light-emitting energies of the respective line heads 11K, 11C, 11M, and 11Y are set substantially equal to sensitivity peak wavelengths of the respective photoconductor drums 12K, 12C, 12M, and 12Y.

The developing units 18K, 18C, 18M, and 18Y, for example, using a non-magnetic toner as an developing agent, carries the developing agent to a developing roller by a supplying roller, regulates the thickness of the developing agent attached to the surface of the developing roller by a regulating blade, makes the developing roller come in contact with or pressed by the respective photoconductor drums 12K, 12C, 12M, and 12Y, and develops an electrostatic latent image as a toner image by attaching the developing agent according to potential levels of the respective photoconductor drums 12K, 12C, 12M, and 12Y.

The respective toner images of black, cyan, magenta, and yellow formed by the above-mentioned four single color toner image forming station is sequentially transferred on the intermediate transfer belt 16 by a first transfer bias applied to the first transfer rollers 19K, 19C, 19M, and 19Y. Then, the toner images forming a full color after being sequentially overlapped on the intermediate transfer belt 16 are transferred to a recording medium P, such as a paper sheet, through a second transfer roller 21. Then, the toner image is fixed on the recording medium P after passing through a pair of fixing rollers 22, serving as fixing portions, and is then exhausted onto a paper ejecting tray 24 through a pair of paper ejecting rollers 23. In addition, the second transfer roller 21 forms a second transfer portion between the intermediate transfer belt 16 and the second transfer roller 21.

In this construction, reference numeral 25 indicates a paper feeding cassette in which a plurality of sheets of recording media P are stacked and held, reference numeral 26 indicates a pickup roller which feeds sheets of the recording media P one by one from the paper feeding cassette 25, reference numeral 27 indicates a pair of gate rollers which defines a timing to supply the recording medium P to the second transfer portion of the second transfer roller 21, and reference numeral 28 indicates a cleaning blade which removes the toner remaining on the surface of the intermediate transfer belt 16 after the second transferring.

Since the image forming apparatus uses the line head 1 according to the present embodiment, electrostatic breakdown of a circuit connected to the clock signal line 305 in the line head 1 can be prevented, thereby preventing defects and securely performing operations.

The invention is not limited to the above-mentioned embodiment, but may be applied to the following modifications:

(1) Although the selecting circuit is composed of the shift register 303 in the embodiment, the selecting circuit is not limited to be constructed by the shift register 303. Any circuit, which generates a selecting signal using a clock signal, is possible; and (2) Although the tandem-type image forming apparatus has been described in the embodiment, the invention is not limited to the tandem type.

What is claimed is:

1. A line head comprising:
   a data line that supplies a data signal;
   a plurality of light-emitting elements arranged in a line, at least one of the plurality of light-emitting elements emitting light selectively based on a selecting signal and the data signal;
   a plurality of circuit elements arranged in a line along the plurality of light-emitting elements;
   a clock signal line;
   a plurality of shift registers, at least one of the shift registers generating the selecting signal based on a clock signal input through the clock signal line; and
   a power wiring line arranged along the clock signal line.

2. The line head according to claim 1,
   wherein the power wiring line is arranged to surround the clock signal line.

3. The line head according to claim 1,
   wherein the light-emitting element is an organic EL light-emitting element.

4. An image forming apparatus comprising:
   photoconductors;
   charging units that charge the photoconductors uniformly;
   exposing units that have the line heads according to claim 1, respectively, to form electrostatic latent images of a target image on the photoconductors by exposing the photoconductors;
   developing units that develop the electrostatic latent images on the photoconductors as toner images;
   transferring units that transfer the toner images on the photoconductors to a transfer member; and
   fixing units that fix the toner images on the transfer member.

5. The image forming apparatus according to claim 4,
   wherein the image forming apparatus forms color images.

6. The line head according to claim 1, wherein the power wiring line is arranged to surround three sides of the clock signal line.

7. The line head according to claim 1, wherein the power wiring line is arranged to surround the clock signal line, except for one side of the clock signal line.

8. A line head comprising:

a data line that supplies a data signal;

a plurality of light-emitting elements arranged in a line, at least one of the plurality of light-emitting elements emitting light selectively based on a selecting signal and the data signal;

a plurality of circuit elements arranged in a line along the plurality of light-emitting elements;

a clock signal line;

a plurality of shift registers, at least one of the shift registers generating the selecting signal based on a clock signal input through the clock signal line; and a ground wiring line arranged along the clock signal line.

9. The line head according to claim 8, wherein the ground wiring line is arranged to surround the clock signal line.

10. The line head according to claim 8, wherein the light-emitting element is an organic EL light-emitting element.

11. An image forming apparatus comprising:

photoconductors;

charging units that charge the photoconductors uniformly;

exposing units that have the line heads according to claim 1, respectively, to form electrostatic latent images of a target image on the photoconductors by exposing the photoconductors;

developing units that develop the electrostatic latent images on the photoconductors as toner images;

transferring units that transfer the toner images on the photoconductors to a transfer member; and fixing units that fix the toner images on the transfer member.

12. The image forming apparatus according to claim 11, wherein the image forming apparatus forms color images.

13. The line head according to claim 8, wherein the ground wiring line is arranged to surround three sides of the clock signal line.

14. The line head according to claim 8, wherein the ground wiring line is arranged to surround the clock signal line, except for one side of the clock signal line.

* * * * *